United States Patent [19]

Takekado

[11] Patent Number: 4,722,014

[45] Date of Patent: Jan. 26, 1988

[54] HEAD POSITIONING MECHANISM FOR MAGNETIC DISK DEVICE

[75] Inventor: Shigeru Takekado, Tokyo, Japan

[73] Assignee: Kabushiki Kaish Toshiba, Kawasaki, Japan

[21] Appl. No.: 833,232

[22] Filed: Feb. 27, 1986

[30] Foreign Application Priority Data

Aug. 23, 1985 [JP] Japan ................................ 60-184039

[51] Int. Cl.⁴ ............................................. G11B 5/55
[52] U.S. Cl. ..................................... 360/106; 360/128
[58] Field of Search ............................. 360/104–106, 360/128

[56] References Cited

U.S. PATENT DOCUMENTS

| 3,881,189 | 4/1975 | Mayeda | 360/106 |
| 4,161,004 | 7/1979 | Dalziel | 360/106 |
| 4,170,146 | 10/1979 | Owens | 74/89.2 |
| 4,366,722 | 1/1983 | Hasler | 74/99 |
| 4,456,937 | 6/1984 | Iftikar | 360/106 |

FOREIGN PATENT DOCUMENTS

| 155999 | 10/1985 | European Pat. Off. | 360/106 |
| 53-123911 | 10/1978 | Japan . | |
| 58-13030 | 11/1983 | Japan . | |

Primary Examiner—A. J. Heinz
Attorney, Agent, or Firm—Schwartz, Jeffery, Schwaab, Mack, Blumenthal & Evans

[57] ABSTRACT

A head positioning mechanism in accordance with the present invention is equipped with a motor with a rotation axis, a pulley which is fixed to the rotation axis, a carriage member which holds the magnetic read/write heads and is guided towards and away from a disk, a flexible band which is wound around the pulley, two attachments which attach the respective ends of the band to spaced apart positions an the carriage member. The two attachments have respective elastic elements to give separately predetermined tension to the band, and at the same time, at least one of the attachments has a damping element which damps the vibration.

17 Claims, 8 Drawing Figures

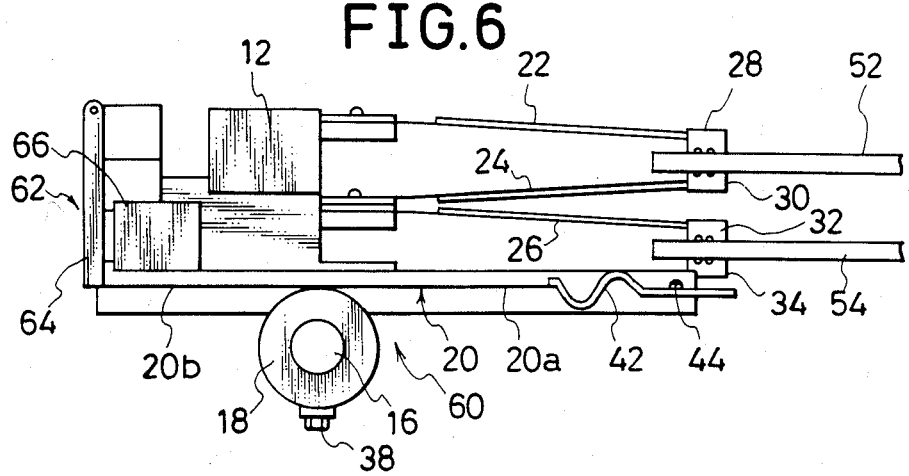
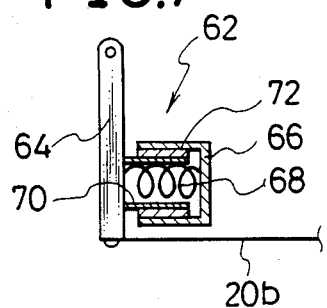
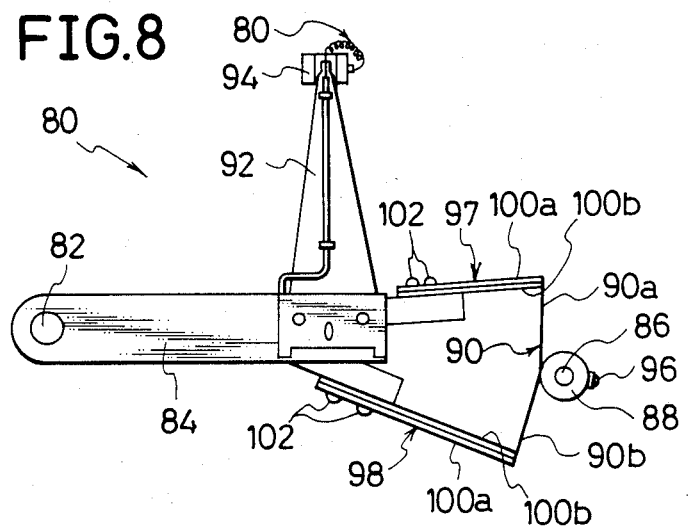

HEAD POSITIONING MECHANISM FOR MAGNETIC DISK DEVICE

BACKGROUND OF THE INVENTION

1. Field of the Invention

The present invention relates to a magnetic disk device for recording/reproducing information by means of a magnetic recording disk, and more particularly, to a head positioning mechanism which enables to enhance the positioning precision and to execute high speed seek.

2. Description of the Prior Art

In a prior magnetic disk device, positioning mechanism is utilized for magnetically writing information or reading recorded information, by moving a head in the radial direction along the concentric tracks recorded on the disk surface.

As one prior positioning mechanism for magnetic disk device one may mention a mechanism such as disclosed in Japanese Pat. No. 53-123911. This mechanism is composed of a carriage which supports the head, a guiding mechanism for giving parallel motion to the carriage, a pulley which is fixed to the rotation axis of a stepping motor and is driver stepwise from one angular position to the next angular position, and a nonstretchable flexible band whose mid section is wound and fixed to the pulley and whose both ends extend from the pulley to the carriage to be fixed there.

The above positioning mechanism operates as follows. Namely, when the stepping motor rotates for a predetermined angle, the pulley is rotated via the rotation axis by a predetermined angle, and one end of the flexible band is wound in around the pulley while the other end is pulled out. Then, the carriage is moved a linear distance which is proportional to the rotation angle of the pulley. In this way, the rotational motion of the pulley is converted to a linear motion of the carriage and the head is shifted stepwise in the radial direction crossing the concentric tracks on the magnetic disk plate, enabling to write information magnetically or read information recorded.

Now, the separation between tracks on the magnetic disk plate of this kind is on the order of 0.070–0.035 mm. Moreover, the time for moving the head from one track to the next is generally on the order of 3 milliseconds. The function of the positioning mechanism of the head is to move the head from one information track to the next information track in a shortest possible time.

However, the flexible band tends to create a slack with decrease in tension in the course of time, giving rise to a possibility of making exact positioning difficult. To avoid this, in a prior device there is installed a leaf spring between one end of the band and the carriage to provide a constant tension to the band. On the other hand, installation of the leaf spring gives rise to a disadvantage of generating a transient vibration when positioning is attempted by driving the stepping motor. Since the transient vibration lasts for such a long time as 50-100 milliseconds, however, it leads to an increase in the seek time.

For this reason, in the above prior device, the inner circumferential surface of the opening in the collar plate which is fixed to the cover side is arranged to make a frictional contact with the armature axis of the stepping motor to effectively damp the transient vibration. However, in such a construction the friction between the armature axis and the collar plate becomes a load to the stepping motor such that there occurs a fear of aggravating the precision of positioning.

In contrast to the above, there exists also a device in which a damping element which utilizes the viscous resistance of fluid is attached to the armature axis for damping the transient vibration in order to alleviate the possibility of creating a load to the stepping motor. In this case, however, there is a possibility that the device will have to be made large in size.

Further, there exists another device in which the transient vibration is attempted to be reduced by electrically devising the driving of the stepping motor. However, such a device is unable to respond to the changes in the characteristics of the stepping motor so that there remains a fear that the design freedom may have to be sacrificed.

SUMMARY OF THE INVENTION

An object of the present invention is to provide a head positioning mechanism for magnetic disk device which is capable of carrying out positioning fast with high precision.

Another object of the present invention is to provide a head positioning mechanism for magnetic disk device which can be made small in size without restricting the freedom in designing the device.

Still another object of the present invention is to provide a head positioning mechanism which is capable of quickly damping the transient vibration that is generated in moving the magnetic head.

A head positioning mechanism in accordance with the present inventin is charactrized in that it includes a motor with rotation axis, a pulley which is fixed to the rotation axis, a carriage member which holds the magnetic read/write head, a guiding mechanism which is linked to the carriage member and forms a path of motion for the carriage member which is parallel to a straight line that makes contact with the pulley as a whole, a flexible band which is wound around the pulley and is fixed to the pulley at its mid section, with its both ends extending from the pulley along the above-mentioned straight line, and attachments which attach the respective ends of the band to positions that are separated by the carriage member, where each of the attachments is equipped with an elastic element that gives a predetermined tension to the respective part of the band, and at the same time, at least one of the attachments is given a construction in which a damping element is provided for damping the vibration.

These and other objects, features and advantages of the present invention will be more apparent from the following description of the preferred embodiments, taken in conjunction with the accompanying drawings.

BRIEF DESCRIPTION OF THE DRAWINGS

FIG. 6 is a simplified side view of a second embodiment of the head positioning mechanism in accordance with the present invention;

FIG. 7 is a cross section view of the attachment section of the head positioning mechanism shown in FIG. 6; and FIG. 8 is a simplified view of a third embodiment of the head positioning mechanism in accordance with the present invention.

DESCRIPTION OF THE PREFERRED EMBODIMENTS

Figure 1:
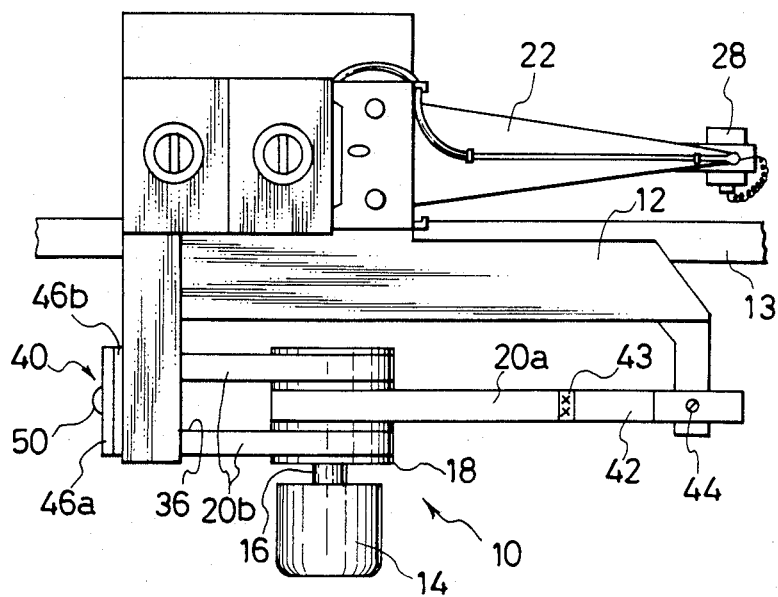
FIG. 1 is a simplified plan view of a head positioning mechanism for magnetic disk device embodiying the present invention.
Figure 2:
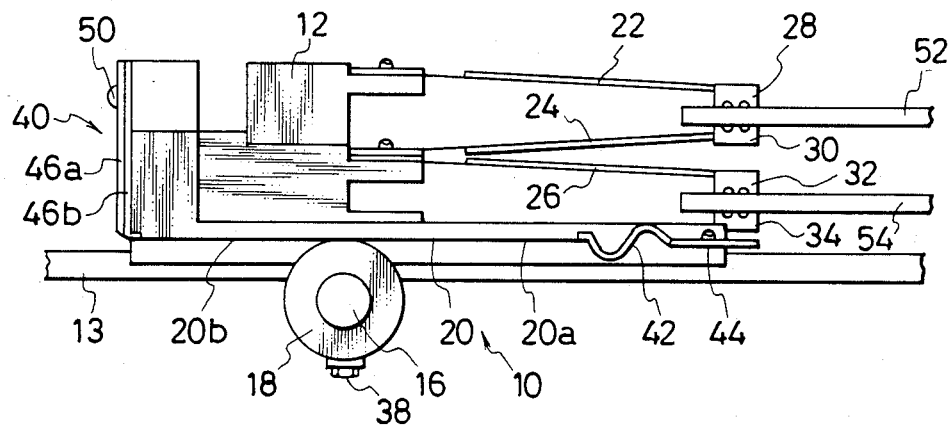
FIG. 2 is a simplified side view of the head positioning mechanism shown in FIG. 1.
Figure 3:
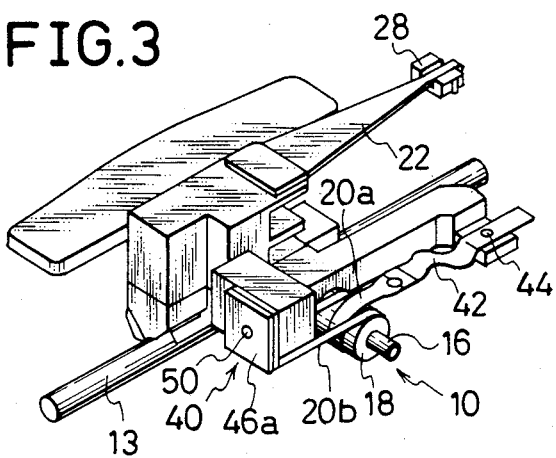
FIG. 3 is a simplified perspective view of the head positioning mechanism shown in FIG. 1.

Referring to FIGS. 1 to 3, a head positioning mechanism for magnetic disk device embodying the present invention is shown with reference numeral 10.

The head positioning mechanism 10 is supported by a frame which is not shown, and includes a carriage member 12 which is supported by a guiding mechanism 13 consisting of a guide rail, as freely slidably in a straight direction, a pulley 18 which is fixed to the rotation axis 16 of a stepping motor 14, and a flexible band 20 with a slight stretching which transmits the rotation of the pulley 18 to the carriage member 12.

On the carriage member 12 there are held via suspensions 22, 24, and 26 magnetic heads 28, 30, 32, and 34. Further, the carriage member 12 is constructed to move, by the help of the guiding mechanism 13, on a moving path which is parallel to the direction of motion of the heads.

The angular position of rotation of the rotation axis 16 of the stepping motor 14 is arranged to be increased selectively at a fixed angle.

Figure 4:
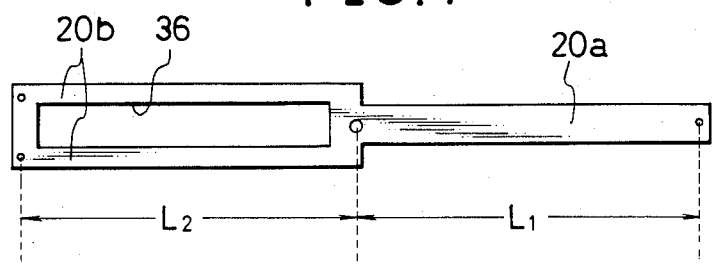
FIG. 4 is a diagram for showing the expanded state of the flexible band in the head positioning mechanism in FIG. 1.

The flexible band 20 is formed of stainless steel, an iron series alloy, or the like, and has a form in which its narrow part 20a and the wide part 20b are united into a single body at its mid section as shown in FIG. 4. In the wide part 20b there is formed a throttle 36 in the longitudinal direction, which serves as a run-off for the narrow part 20a. The mid section of the flexible band 20 is fixed to the pulley 18 via a bolt 38, and is wound around the pulley 18 for one turn. The end section of the wide part 20b of the flexible band 20 is joined by welding or the like to the free end 41 of a first attachment 40 which is fixed to one end of the carriage member 12. The end section of the narrow part 20a of the flexible band 20 is joined by welding or the like to the free end 43 of a second attachment 42 which is fixed to the end section on the magnetic head side of the carriage member 12.

The second attachment 42 is constructed with spring steel shaped in the form of letter S. It is fixed to one end of the carriage member 12 via a bolt 44, forming an elastic element that gives a tension to the flexible band 20. The first attachment 40 is constructed by pasting two sheets of leaf spring 46a and 46b, and is fixed to the other end of the carriage member 12 via a bolt 50. Therefore, the first attachment 40 constitutes an elastic element which gives a tension to the flexible band 20 and a damping element which damps the transient vibration that will be generated at the driving of the carriage member 12 by the rotation of the rotation axis 16 of the stepping motor 14.

This means that the flexible band 20 is provided with a tension for all times by the elastic elements of the attachments 40 and 42, so that a stable tension can be given to the flexible band 20 over a long period of time, stabilizing the positioning precision of the heads over a long time. In addition, the transient vibration that will be generated at stopping of the stepping motor 14 can be damped quickly by means of the damping element of the first attachment. Moreover, it is possible, as in a modification shown in FIG. 5, to construct a first attachment 48 by pasting two sheets of leaf spring 46a and 46b and a viscous member 49 such as a rubber plate to be inserted between the leaf springs 46a and 46b. In this modification, the viscous memeber 49 like a rubber plate possesses a high damping function for the energy in the shearing direction so that it becomes possible to damp more quickly the transient vibration that will be generated at the stopping of the stepping motor 14.

On the other hand, the spring constants of the elastic elements in the attachments 40 and 42 are set so as to be inversely proportional to the lengths of the narrow part 20a and the wide part 20b of the flexible band 20. That is, as shown in FIG. 4, if the expanded length of the flexible band 20 from its section of fixing to the pulley 18 by the bolt 38 to the welded section to the free end 43 of the second attachment 42 is called $L_1$, and the expanded length from the section of fixing, to the pulley 18 to the welded section to the free end 41 of the first attachment is called $L_2$, then the spring constants $K_2$ and $K_1$ of the attachments 40 and 42 are set to be inversely proportional to the lengths $L_2$ and $L_1$ so as to satisfy the relation $L_1K_1 = L_2K_2$.

By constructing the flexible band 20 in this way, the deviation between the lengths of the carriage member 12 and the flexible band 20 due to changes in the surrounding temperature can be absorbed effectively by the attachments 40 and 42 as will be described later. Therefore, it becomes possible to prevent the so-called thermal off-track in which the magnetic heads 28 to 34 move toward the side of inner circumference with a rise in temperature.

It should be noted here that the magnetic disk plates 52 and 54 are arranged to be held between the magnetic heads 28, 30 and 32, 34, respectively.

Next, the operation of the first embodiment will be described.

If the pulley 18 is rotated by a predetermined angle in clockwise direction, for example, in FIG. 2, via the rotation axis 16 by the stepping motor 14, the narrow part 20a of the flexible band 20 is unwound from the pulley 18 while the wide part 20b is rolled up on the pulley 18. Then the carriage member 12 is pulled toward right of FIG. 2 due to the tension on the wide part 20b of the flexible band 20, and is slided linearly along the guiding mechanism 13. If the stepping motor 14 has 100 steps, the rotation axis 16 rotates stepwise in an angle of 3.6°. Then, the carriage member 12 is moved stepwise by a linear distance which is proportional to the angle of rotation of the pulley rotated via the rotation axis 16. As a result of the motion of the carriage member 12, the magnetic heads 28-34 are moved stepwise via the suspensions 22, 24, and 26 in the radial direction of the magnetic disk plates 52 and 54 crossing the concentric tracks on these plates. This enables one to write information magnetically or read prerecorded information.

In a head positioning mechanism that operates as in the above, it is necessary to stably maintain the positioning precision over a long period of time. Since the flexible band 20 of the embodiment is fixed to the carriage member 12 via the attachments 40 and 42 with elastic element, a predetermined tension can be given to the flexible band 20 for all times regardless of stretching of the flexible band 20 in the course of time. Therefore, it is made possible to achieve a stable head positioning precision for a long time.

Now, the carriage member 12 undergoes a transient vibration at the time of stopping the stepping motor 14. However, since the wide part 20b of the flexible band 20 is fixed to one of the side ends of the carriage member 12 via the first attachment 40 that has a damping element, the vibration energy of the carriage member 12 is absorbed by the first attachment 40 and the vibration can hence be damped quickly.

Now, when the first attachment 40 is vibrated due to transient vibration, the leaf springs 46a and 46b shift relatively in the direction along their surfaces, absorbing the energy of vibration.

Figure 5:
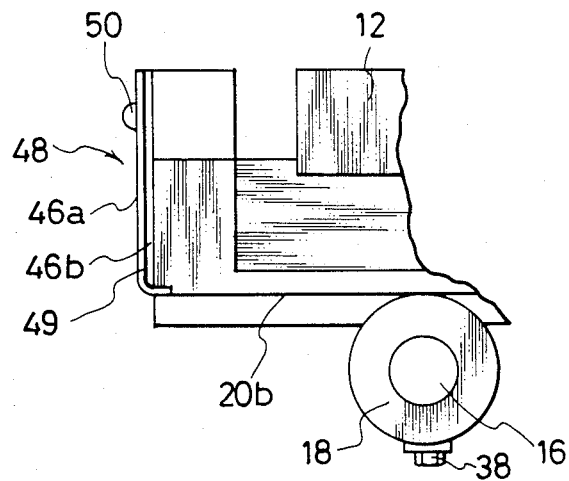
FIG. 5 is a side view of a modification of the first attachment in the head positioning mechanism shown in FIG. 1.

In addition, in the modification shown in FIG. 5, the leaf springs 46a and 46b that form a damping element shift relatively to each other in the direction along their common surface, and the vibrational energy is absorbed by a shearing deformation created in the viscous member 49 that is inserted between the leaf springs 46a and 46b. Consequently, it becomes possible to execute a high speed seek. Moreover, it is possible to make the damping element small in size since it has a simple construction obtainable by pasting the leaf springs 46a and 46b together or by inserting a viscous member 49 between the springs. Further, the damping element will not become a load at the time of driving the stepping motor 14 so that there will arise no deterioration in the positioning precision. Therefore, the damping element can respond to the changes in the characteristics of the stepping motor 14.

Moreover, occurrence of thermal off-track can be prevented since the spring constants of the first and the second attachments 40 and 42 as an elastic element are set to the values that are inversely proportional to the lengths of the narrow part 20a and the wide part 20b of the flexible band 20. In what follows the preventive mechanism of thermal off-track for the present embodiment will be described by comparing it with the case in the prior mechanism. In general, the factors that determine the positioning of the magnetic heads are the frame, the flexible band, carriage member, and the suspensions for the magnetic heads. For a prior device of pre-pressured constant pressure type, they are the band lengths between the fixed point of the flexible band to the carriage member and the fixed point of the flexible band to the pulley, and the lengths of the suspensions that are to be considered at the time of determining the positions of the two magnetic heads. Because of the fact that both suspensions are made of a metal of stainless steel system and have a coefficient of thermal expansion which is smaller than that for the metal of aluminum system that constitutes other parts, they lead to a disadvantage that the magnetic heads deviate from the recording tracks with a rise in the surrounding temperature. To avoid this, the spring portion of the band is generally arranged to be on the magnetic disk side in order to cancel out the coefficients of thermal expansion of the band and the suspensions. Since, however, the length of the band is usually larger than the length of the suspensions, it results in the generation of "thermal off-track" in which the magnetic heads move toward the side of inner circumference with a rise in the temperature. Among positioning devices with smaller toleration for "thermal off-track," there are some which use a magnesium alloy, that has larger coefficient of thermal expansion than an alluminum alloy, as the frame material, and with rise in temperature, shift the rotation center of the stepping motor that is fixed to the frame toward the outer circumference in order to reduce the "thermal off-track" effect. However, there are disadvantages in such devices that the manufacture of a frame made of magnesium alloy is difficult, and the required cost is high also.

In contrast, in the first embodiment of the present invention, the lengths of the carriage member 12 and the flexible band 20 vary with changes in the surrounding temperature, and the deviation between the lengths is absorbed by the two elastic elements. When the spring constants of the narrow part 20a and the wide part 20b are set as described earlier, inversely proportional to the lengths of these parts, the elastic element with smaller length absorbs a smaller fraction of the deviation while the elastic element with larger length absorbs the remaining larger fraction of the deviation. When this is seen from the carriage member 12 side, it looks as if the flexible band 20 is made of the same material as for the carriage member 12 so far as the thermal deformation is concerned. Accordingly, as seen from the standpoint of reducing thermal off-track of the magnetic heads 28–34, it looks as if the present magnetic disk device is entirely made of an aluminum alloy except for the suspensions 22, 24, and 26. On the other hand, as the temperature goes up, the magnetic heads 28–34 shift toward the outer circumference of the plates since the suspensions 22–26 are made of stainless steel. However, for the frame, use is generally made of ADC-12 of aluminum die cast material that has a coefficient of thermal expansion of about $21 \times 10^{-6}$ 1/°C. which is smaller than that for the magnetic disk plates 52 and 54 (about $24 \times 10^{-6}$ 1/°C). Therefore, the contraction in the suspensions 22–26 is canceled almost completely, suppressing the generation of "thermal off-track" nearly perfectly.

Referring to FIGS. 6 and 7, a second embodiment of the head positioning mechanism in accordance with the present invention is shown with reference numeral 60.

In the embodiment, a first attachment 62 which joins the wide part 20b of the flexible band 20 to the carriage member 12 is constructed as in the following way. Namely, the attachment 62 constitutes an elastic element as shown in FIG. 7 by a revolving arm 64 whose axis is supported freely revolvably by the carriage member 12, a supporting cylinder 66 which is formed as a united body with the carriage member 12, and a coil spring 68 which is provided inserted between the revolving arm 64 and the supporting cylinder 66. Further, there is fixed on the revolving arm 64 an insertion cylinder 70 which is inserted into the supporting cylinder 66, and a damping element is constituted by placing a viscous member 72 such as rubber between the insertion cylinder 70 and the supporting cylinder 66. Other components are approximately identical to those in the first embodiment so that further explanation will be omitted by designating them by the same symbols.

In this embodiment it is also possible to give a predetermined tension to the flexible band 20 via the revolving arm 64, and moreover, the transient vibration can be damped by the damping element. Therefore, effects that are approximately identical to those of the first embodiment can be expected.

Referring to FIG. 8, a third embodiment of the head positioning mechanism in accordance with the present invention is shown with reference numeral 80.

It should be noted that the embodiment is suited for application to a magnetic disk device of rotation type. The head positioning mechanism 80 is supported by a frame which is not shown and includes a carriage member 84 which is supported revolvably by a rotation axis 82 that acts as a guiding mechanism, a pulley 88 which is fixed to the rotation axis 86 of a stepping motor which is not shown, and a flexible band 90 with small elongation which transmits the rotation of the pulley 88 to the carriage member 84.

Held by the carriage member 84 via a suspension 92 is a magnetic head 94.

The flexible band 90 is formed with such material as stainless steel or an iron alloy. The mid section of the flexible band 90 is fixed to the pulley 88 via a bolt 96, wound for one turn around the pulley 88, and the end of the narrow part 90a is joined by welding or other means to a first attachment 97 which is fixed to the end on the magnetic head side of the carriage member 84. In addition, the end of the wide part 90b of the flexible band 90 is joined by welding or other means to a second attachment 98 which is fixed to the end on the side opposite to the magnetic head of the carriage member 84.

The attachments 97 and 98 are constituted by pasting two leaf springs 100a and 100b, and their base ends are fixed to the carriage member 84 via the bolts 102. Therefore, the attachments 97 and 98 constitute the elastic elements which give predetermined tensions to the flexible band 90 and the damping elements which damp the transient vibration that will be generated at the time of driving or stopping the carriage member 84 through the rotation of the rotation axis 86 of the stepping motor. Other components are approximately identical to those of the first embodiment so that no further explanation will be given.

In the present embodiment, the transient vibration that will be generated at the time of stopping the stepping motor will be absorbed by the frictional resistance that will be created due to the relative motion between the two leaf springs 100a and 100b of the attachments 97 and 98. Therefore, approximately same effects as in the first embodiment can also be expected for the present embodiment.

Moreover, analogous to the modification to the first embodiment, it is also possible in the third embodiment to give a construction in which a viscous member such as a rubber plate is inserted between the two leaf springs of the attachments 97 and 98. In that case, it will become possible to achieve a faster damping of the vibration.

In summary, according to the construction of the present invention, it becomes possible to give a stable tension to the band over a long duration due to the action of the elastic elements that are provided at both ends of the band, so that it is possible to stabilize the head positioning precision over a long period of time. Further, since the transient vibration that will be generated at the time of moving the magnetic heads can be damped quickly by means of the damping elements, it becomes possible to achieve a high speed seek. Since the damping elements will not become a load to the motor, there will arise no deterioration of the precision in positioning. Moreover, it becomes possible to make the device as a whole small in size since the damping elements themselves can be made small in size. Finally, the damping elements can respond to the changes in the characteristics of the motor so that there will be no restriction on the freedom of designing.

What is claimed is:

1. A head positioning mechanism for accessing the magnetic read/write heads to the desired positions on the magnetic disk surfaces of magnetic disks, comprising:
    (a) a carriage member for holding the magnetic read/write mechanism and having ends adapted to secure the ends of a flexible band;
    (b) a guiding mechanism for guiding said carriage member in the direction of motion of the magnetic heads;
    (c) a motor with rotation axis for moving said carriage member;
    (d) a pulley which is fixed to the rotation axis of said motor;
    (e) a flexible band whose mid section is fixed to said pullley and is wound around it, for transmitting the rotational force of said pulley to said carriage member;
    (f) a first and a second attachments for attaching both ends of said flexible band to the respective ends of said carriage member so as to move said carriage member in the direction of motion of the heads due to rotation of said pulley; and
    (g) said first and second attachments having respective elastic elements for giving a predetermined tension to said flexible band and a discrete damping element affixed to either of said first or second attachments for damping vibration of the head positioning mechanism.

2. A head positioning mechanism as claimed in claim 1, in which
    said first attachment has both of an elastic element and a damping element, and said second attachment has an elastic element.

3. A head positioning mechanism as claimed in claim 2, in which
    said first attachment is composed by stacking, in sandwich fashion, two leaf springs and a viscous member which is held between these leaf springs, one of its ends being fixed to one end of said carriage member, and to its free end being attached one end of said flexible band.

4. A head positioning mechanism as claimed in claim 3, in which
    said second attachment being constructed by spring steel which is formed in the shape of letter S, one of its ends being fixed to the other end of said carriage member, and to its free end being attached the other end of said flexible band.

5. A head positioning mechanism as claimed in claim 2, in which
    said first attachment is composed by stacking two leaf springs, in sandwich fashion, one of its ends being fixed to one end of said carriage member, and to its free end being attached one end of said flexible band.

6. A head positioning mechanism as claimed in claim 5, in which
    said second attachment being constructed by spring steel which is formed in the shape of letter S, one of its ends being fixed to the other end of said carriage member, and to its free end being attached the other end of said flexible band.

7. A head positioning mechanism as claimed in claim 2, in which
    said first attachment comprises a revolving arm whose axis is supported freely revolvably by one end of said carriage member, a supporting cylinder which is formed as a united body with said carriage member, and a coil spring which is provided inserted between the revolving arm and the supporting cylinder, with one end of said flexible band attached to the free end of the revolving arm.

8. A head positioning mechanism as claimed in claim 7, in which
said second attachment is constructed by spring steel which is formed in the shape of letter S, with its one end fixed to the other end of said carriage member and the other end of said flexible band attached to its free end.

9. A head positioning mechanism as claimed in claim 2, in which said guiding mechanism comprises a guide rail.

10. A head positioning mechanism as claimed in claim 1, in which said flexible band has a narrow part and a wide part and is formed into a single body by uniting said narrow part and said wide part at its mid section, a throttle being formed in the wide part in its longitudinal direction to serve as a run-off for the narrow part, and its mid section being fixed to said pulley and being wound around it for one turn.

11. A head positioning mechanism as claimed in claim 10, in which the spring constants for the elastic elements of said first and second attachments and the lengths of the narrower part and the wider part of said flexible band satisfy the following relation $$L_1 K_1 = L_2 K_2,$$

where
$L_1$ is the length between the fixing point of the flexible band to the pulley and the attaching point at the free end of the second attachment,
$L_2$ is the length between the fixing point of the flexible band to the pulley and the attaching point at the free end of the first attachment,
$K_1$ is the spring constant of the second attachment, and
$K_2$ is the spring constant of the first attachment.

12. A head positioning mechanism as claimed in claim 1, in which
said first end second attachments have both of an elastic element and a damping element.

13. A head positioning mechanism as claimed in claim 12, in which
said guiding mechanism comprises a rotation axis which rotatably supports said carriage member, and said first and second attachments are each constructed by stacking two leaf springs, in sandwich fashion, one end of the respective attachments being fixed to one end and the other end of said carriage member, and to the respective free ends are attached one end and the other end of said flexible band.

14. A head positioning mechanism as claimed in claim 13, in which
said flexible band is formed into a single body by uniting a narrow part and a wide part at its mid section, a throttle is formed in the longitudinal direction of the wide part to serve as run-off for the narrow part, and the mid section is fixed to said pulley and is wound around it for one turn.

15. A head positioning mechanism as claimed in claim 14, in which
the spring constants of the elastic elements of said first and second attachments, and the lengths of the narrow part and the wide part of said flexible band satisfy the relation $$L_1 K_1 = L_2 K_2,$$

where
$L_1$ is the length between the fixing point of the flexible band to the pulley and the attaching point at the free end of the second attachment, $L_2$ is the length between the fixing point of the flexible band to the pulley and the attaching point at the free end of the first attachment, $K_1$ is the spring constant of the second attachment, and $K_2$ is the spring constant of the first attachment.

16. A head positioning mechanism for accessing the magnetic read/write heads to the desired positions on the magnetic disk surfaces of magnetic disks, comprising:
(a) a carriage member for holding the magnetic read/write mechanism and having ends adapted to secure the ends of a flexible band;
(b) a guiding mechanism for guiding said carriage member in the direction of motion of the magnetic heads;
(c) a motor with a rotation axis for moving said carriage member;
(d) a pulley which is fixed to the rotation axis of said motor;
(e) a flexible band whose mid section is fixed to said pulley and is wound around it, for transmitting the rotational force of said pulley to said carriage member; and
(f) first and second attachments for attaching both ends of said flexible band to the respective ends of said carriage member so as to move said carriage member in the direction of motion of the heads due to rotation of said pulley, said first and second attachments having respective elastic elements for giving a predetermined tension to said flexible band, said first attachment composed of two leaf springs stacked in sandwich fashion with a viscous member therebetween to provide damping as well as tension and having one end fixed to one end of said carriage member and a free end attached to one end of said flexible band.

17. A head positioning mechanism for accessing the magnetic read/write heads to the desired positions on the magnetic disk surfaces of magnetic disks, comprising:
(a) a carriage member for holding the magnetic read/write mechanism and having ends adapted to secure the ends of a flexible band;
(b) a guiding mechanism for guiding said carriage member in the direction of motion of the magnetic heads;
(c) a motor with a rotation axis for moving said carriage member;
(d) a pulley which is fixed to the rotation axis of said motor;
(e) a flexible band whose mid section is fixed to said pulley and is wound around it, for transmitting the rotational force of said pulley to said carriage member;
(f) first and second attachments for attaching both ends of said flexible band to the respective ends of said carriage member so as to move said carriage member in the direction of motion of the heads due to rotation of said pulley, said first and second attachments having respective elastic elements for giving a predetermined tension to said flexible band, said first attachment composed of two leaf springs stacked in sandwich fashion with a viscous member therebetween to provide damping as well as tension and having one end fixed to one end of said carriage member and a free end attached to one end of said flexible band and said second attachment constructed of spring steel is formed in the shape of the letter "S," and having one of its ends fixed to the other end of said carriage member and its free end attached to the other end of said flexible band.

* * * * *